United States Patent [19]

Wakabayashi

[11] 3,891,958

[45] June 24, 1975

[54] HUMIDITY SENSOR

[75] Inventor: Takashi Wakabayashi, Osaka, Japan

[73] Assignee: Matsushita Electric Industrial Co., Ltd., Osaka, Japan

[22] Filed: Aug. 2, 1973

[21] Appl. No.: 384,936

[30] Foreign Application Priority Data

Sept. 20, 1972 Japan .............................. 47-94737

[52] U.S. Cl. ............ 338/35; 260/3.3; 260/857 UN; 260/857 L; 260/857 D; 117/161 ZA; 117/218; 338/34

[51] Int. Cl. ............................................ H01c 13/00

[58] Field of Search ......... 338/34, 35; 260/3.3, 899, 260/889, 41 R, 41.5 R, 3, 857 Un, 857 L, 857 D; 117/161 ZA, 218

[56] References Cited

UNITED STATES PATENTS

| | | | |
|---|---|---|---|
| 3,073,161 | 1/1963 | Crabtree | 338/35 |
| 3,167,734 | 1/1965 | Brucken et al. | 338/35 |
| 3,780,141 | 12/1973 | Jin et al. | 260/899 |

*Primary Examiner*—Murray Tillman
*Assistant Examiner*—J. Ziegler
*Attorney, Agent, or Firm*—Wenderoth, Lind & Ponack

[57] ABSTRACT

This invention provides a humidity sensor comprising a humidity sensitive film which consists essentially of a reaction product of a chlorine containing polymer and a polyamide resin, and two electrodes applied to said humidity sensitive film. The electrical resistance of the humidity sensor decreases as the humidity of an atmosphere under which the humidity sensor is placed increases. The humidity sensor has high stability, high sensitivity to humidity and rapid response to the change of humidity.

6 Claims, 5 Drawing Figures

HUMIDITY SENSOR

This invention relates to a humidity sensor comprising a humidity sensitive film having two electrodes applied thereto.

It is known that e.g. a material comprising lithium chloride, inorganic semiconductive material such as silicone or selenium, and metal oxide such as aluminum oxide or magnetite, has sensitivity to humidity and can be used as a humidity sensor. However, such material does not have sufficiently high stability, sufficiently high sensitivity to humidity and sufficiently rapid response to the change of humidity.

Accordingly, it is an object of this invention to provide a humidity sensor having sufficiently high stability, high sensitivity to humidity and rapid response to the change of humidity.

This object is achieved by providing a humidity sensor comprising a humidity sensitive film which consists essentially of a reaction product of a chlorine containing polymer and a polyamide resin, and two electrodes applied to said humidity sensitive film. The electrical resistance of the humidity sensor decreases as the humidity of an atmosphere under which the humidity sensor is placed increases.

This and other objects and features of this invention will be apparent upon consideration of the following detailed description taken together with the accompanying drawings, wherein.

Figure 1:
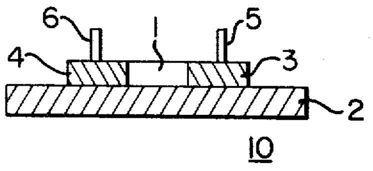
FIG. 1 is a schematic cross-sectional view of one embodiment of a humidity sensor of this invention.
Figure 4:
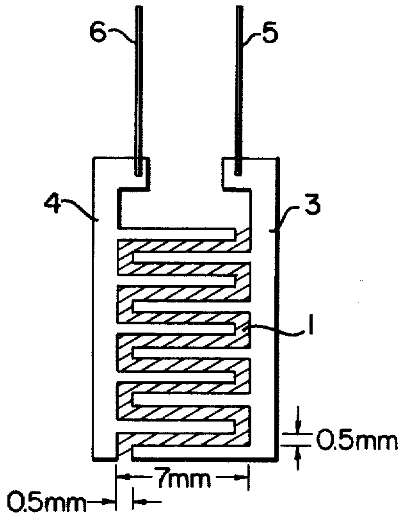
FIG. 4 is a top plan view of a humidity sensor having electrodes of comb shape as one example of electrodes.

Referring to FIG. 1, reference numeral 10 designates, as a whole, one example of a humidity sensor of this invention. Reference numeral 1 designates a humidity sensitive film interposed between two electrodes 3 and 4. They are provided on a substrate 2. Two electrical leads 5 and 6 are connected to the electrodes 3 and 4, respectively. The substrate 2 can be made of any available and suitable material. For example, glass can be used therefor. The two electrodes 3 and 4 can be made of any available and suitable materials. For example, graphite paint can be used therefor. The distance between the two electrodes 3 and 4 can be chosen optionally. If the total resistance of the humidity sensitive film is required to be lower, the distance between the electrodes 3 and 4 is designed shorter. The shape of the electrodes 3 and 4 can be designed optionally Electrodes of a comb shape as shown in FIG. 4 is preferable for obtaining a very low resistance of the humidity sensitive film 1 in a very limited space, because the effective width of each electrode is very long. In the case of the dimensions as illustrated in FIG. 4, the effective width of each electrode (i.e. effective width of the humidity sensitive film) is about 70 mm.

The thickness of the humidity sensitive film 1 can be chosen optionally. However, as the thickness of the humidity sensitive film increases, the humidity sensitive film 1 has slower response to the change of humidity, but lower electrical resistance. Broadly speaking, if the thickness becomes half, the response time (defined later) also becomes half. It is a matter of course that the electrical resistance then becomes double. It is preferred that the thickness of the humidity sensitive film 1 is designed to be between 2 and 5 microns, but it can be thicker or thinner than that. It is further preferable that the humidity sensitive film is more uniform.

In preparing a humidity sensitive film 1, a chlorine containing polymer is mixed with a polyamide resin. It is preferred from the view point of the stability and the electrical resistance of the resultant humidity sensitive film that the reactive proportion of the chlorine containing polymer and the polyamide resin is 45 to 90 weight % of polyamide resin and 10 to 55 weight % of chlorine containing polymer. That is, if a mixture of a chlorine containing polymer and a polyamide resin includes more than 90 weight % of polyamide resin, the resultant humidity sensitive film has unstable ionic conductance at high humidity environment. If the mixture includes less than 45 weight % of polyamide resin, the resultant humidity sensitive film has high electrical resistance. Preferable materials for the chlorine containing polymer are:

(1) chlorinated diene polymer or dien-monoen polymer such as chlorinated natural rubber;

2 chlorine containing vinyl polymer such as polyvinyl chloride and polyvinylidene chloride; and 3 chloro-substituted polyolefine such as chlorinated polyethylene and polypropylene. Among them, chlorinated natural rubber is most preferable. In the case of chlorinated natural rubber, chlorinated natural rubber having 68 weight % of chlorine incorporated therein is best. (It is known that 68 weight % of chlorine is the maximum amount of chlorine which can be stably added to natural rubber). There is also a stable chlorinated natural rubber containing 34 weight % of chlorine, but if this chlorinated natural rubber is used, the amount thereof should be more than that in the case of the chlorinated natural rubber containing 68 weight % of chlorine.

Preferable materials for the polyamide resin are those produced by the condensation of a carboxylic acid with an alkylene polyamine such as ethylene diamine, diethylene triamine and triethylene tetramine. The carboxylic acids include saturated or unsaturated fatty acids and polycarboxylic acids obtained by the thermal polymerization of unsaturated fatty acids. According to this application, the product obtained by the condensation of a carboxylic acid with an alkylene polyamine is defined as a "condensation product of a carboxylic acid and an alkylene polyamine". The content of active primary amino group of the polyamide resin has a great effect on the reactivity of the polyamide resin with a chlorine containing polymer and also on the resistivity of the resultant humidity sensitive film. That is, a polyamide resin having higher content of active primary amino group can more easily react with a chlorine containing polymer and causes the production of a humidity sensitive film having lower resistivity. It is preferred that the amine value which represents the content of the active primary amino group is larger than 100.

The mixture of a chlorine containing polymer and a polyamide resin is dissolved in a solvent into a solution. Any available and suitable solvent which dissolves both the chlorine containing polymer and the polyamide resin can be used therefor. For example, toluene and ortho-dichlorobenzene can be used therefor. If required, the solution is adjusted to have a proper viscosity. For example, a solution to about 50 poises is suitable for squeezing the solution on a glass substrate having electrodes thereon. However, the viscosity can be e.g. 10 poises or 100 poises. If the viscosity is lower, a thinner humidity sensitive film is made, while if it is higher, a thicker humidity sensitive film is obtained. The solution can further include a filler, an antioxidant agent, an ultraviolet absorbant and/or a plasticize for increasing the stability of the resultant humidity sensitive film. The solution is applied to the surface of a suitable substrate by a suitable method. For example, well known methods of squeezing, dipping and printing can be used therefor. Electrodes can be applied after the step of applying the solution but it is easier for manufacturing a humidity sensor if the electrodes are applied to the substrate before the solution is applied to the substrate.

Then, the substrate with the solution of a chlorine containing polymer and a polyamide resin is heated at a suitable heating temperature for a suitable heating time. The heating time depends on the heating temperature. The heating temperature and heating time are preferably chosen to make the chlorine containing polymer react with the polyamide resin suitably. At a certain heating temperature, as the heating time increases up to a critical heating time, the resultant humidity sensitive film has a lower resistivity. However, when the heating time exceeds the critical heating time, the resistivity of resultant humidity sensitive film increases as the heating time increases. Since it is usually preferable that the resistance of the humidity sensitive film is lower, it is preferred that the heating time is not too long. At a heating temperature of 130°C, for example, the heating time is preferably less than about 5 hours and more than 3 minutes, most preferably about 30 minutes. At a heating temperature of 160°C, for example, the heating time is preferably less than about 30 minutes and more than 2 minutes, most preferably about 5 minutes.

The humidity dependence of resistance according to the humidity sensitive film of this invention may be attributable to the chlorine ions produced from the chlorine containing polymer by the reaction of the chlorine containing polymer and the polyamide resin. Accordingly, it is preferred that the amount of chlorine in the chlorine containing polymer is larger. The polyamide resin is considered to act to adsorb moisture. Accordingly, it is preferred that the material used as a polyamide resin has a function to adsorb more moisture.

According to this application, the final product obtained by the reaction of a chlorine containing polymer and a polyamide resin is defined as a "reaction product of a chlorine containing polymer and a polyamide resin". This is because the final product has a very complicated structure and cannot be clearly analyzed, so that it cannot be defined otherwise. Further, that definition is not unclear.

Figure 3:
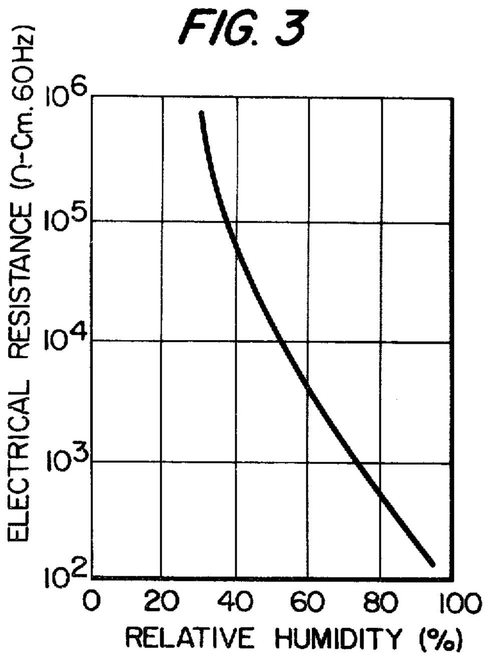
FIG. 3 is a graph illustrating a curve of electrical resistance vs. relative humidity (at20°C) of a humidity sensitive film.

The electrical resistance of the resultant humidity sensitive film decreases as the humidity increases, and the humidity sensitive film has a unique curve of electrical resistance vs. relative humidity (RH) as of FIG. 3. The curve of electrical resistance vs. RH of a humidity sensitive film is obtained by the humidity test as follows. The humidity sensitive film (sensor) is placed under an atmosphere having a temperature of 20°C and a certain humidity. During the initial time period, the resistance of the humidity sensitive film continues changing as time passes. However, a sufficient time thereafter, the resistance does not change any more. This final resistance is plotted on a resistance vs. RH characteristic graph. Likewise final resistances of the humidity sensitive film at many other humidities (20°C) are plotted on the graph. By connecting the plots, the curve as of FIG. 3 is obtained.

The humidity sensitive film produced by this invention has a high stability, high sensitivity to humidity and rapid response to the change of humidity which is represented by a "response time". The word response time used in this application is defined as follows. First, the curve of resistance vs. RH (at 20°C) as of FIG. 3 of a humidity sensitive film having a thickness of 5 microns is made. From the curve, the resistances at 55 %RH and [55 + (75−55)×0.95]= 74 %RH are obtained. Then, the humidity sensitive film is placed under an atmosphere of 55 %RH (20°C) for a sufficient time to have an electrical resistance corresponding to the curve of the resistance vs. RH at 55 %RH. Thereafter, the humidity sensitive film is instantaneously moved to an atmosphere having 75 %RH (20°C). The resistance of the humidity sensitive film starts decreasing and reaches a value corresponding to the 74 %RH on the curve of resistance vs. RH. The time required for the humidity sensitive film (20°C) to reach the resistance value corresponding to the 74 %RH from the time when the humidity sensitive film is instantaneously moved to the atmosphere of 75 %RH is defined in this application as the response time of the humidity sensitive film. In short, the response time is a time necessary for 95 % change of RH when a humidity sensitive film having a thickness of 5 microns is subjected to a step humidity change from 55 %RH to 75 %RH at 20°C. The humidity sensitive film as illustrated in Example 1 has a response time of about 20 seconds.

Figure 2:
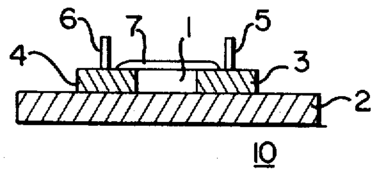
FIG. 2 is a schematic cross-sectional view of a humidity sensor as of FIG. 1, which further has a protective cover coated on the humidity sensitive film thereof.

The humidity sensor of this invention can further have a protective cover of a thin film coated on the humidity sensitive film thereof as schematically shown in FIG. 2, in which reference numeral 7 designates the protective cover. The protective cover protects the humidity sensitive film from environmental contaminated air or moisture, and increases the stability of the humidity sensitive film. Any available and suitable materials which are moisture permeable, chemically stable and inactive to the humidity sensitive film can be used for the protective cover. For example, a silicone resin such as polydimethyl siloxan, and a porous polyflorotetraethylene can be used therefor. The thickness of the protective cover is preferably between 0.5 micron and 2 microns in view of the moisture permeability.

This invention will be understood more readily with reference to the following Examples 1–4, but these Examples are intended to illustrate the invention only and not to be construed to limit the scope of the invention.

EXAMPLE 1

Chlorinated natural rubber having 68 weight % of chlorine incorporated therein was mixed, in various reactive proportions, with polyamide resin (Tohomide 245: trade name of Fuji Chemical Industrial Co., Japan) produced by the condensation of dimer acid with alkylene polyamine and having amine value of 415. The reactive proportions of the thus prepared mixtures fell within the range of 70 to 5 weight % of chlorinated natural rubber and 30 to 95 weight % of polyamide resin. Table 1 lists four mixtures out of the thus prepared mixtures. One weight part of each mixture was dissolved in 5 weight parts of toluene so as to make a solution. Each solution was adjusted to have a viscosity of 50 poises at room temperature. Each solution was applied to a glass substrate having two graphite paint electrodes of comb shape as shown in FIG. 4 and then heated at 130°C for 30 minutes so as to make a humidity sensor. The humidity sensitive film of each of the thus prepared humidity sensors had a thickness of 5 microns and an effective width of 70 mm. The distance between the two electrodes was 0.5 mm. Two electrical leads were connected to the two electrodes on each glass substrate. Thus, various humidity sensors were prepared.

Then humidity test was carried out. It was found that a humidity sensitive film including more than 90 weight % of polyamide resin had unstable ionic conductance at high humidity environment, and also that a humidity sensitive film including less than 45 weight % of polyamide resin had too high electrical resistance similar to the electrical resistance of chlorinated natural rubber. It was found that a humidity sensitive film havinng about 45 to 90 weight % of polyamide resin had stable low resistance. Table 1 lists resistances of the humidity sensors at various relative humidities (RH).

a humidity of 30 %RH for 10 minutes, and the electrical resistance then was measured. Thereafter, each humidity sensor was instantaneously moved to an atmosphere having a humidity of 95 %RH (20°C) and was kept there for 24 hours. After this 24 hours, each humidity sensor was instantaneously moved back to the atmosphere of humidity of 30 %RH (20°C) and was kept there for 10 minutes, and the electrical resistance then was measured. The deviation of this latter measured resistance of each humidity sensor from the former measured resistance thereof fell within ± 1 % range in terms of %RH. This measurement was carried out several times, but each time, the latter measured resistance of each humidity sensor fell within ± 1 % range, in terms of %RH, of the former measured resistance value.

EXAMPLE 2

Figure 5:
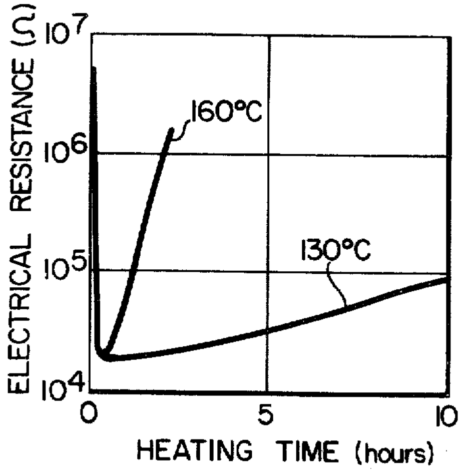
FIG. 5 is a graph illustrating two curves of heating time vs. electrical resistance of humidity sensors at 75 %RH (20°C) in the case when the heating temperatures used in preparing the humidity sensors are 130°C and 160°C, respectively.

Many samples having the same composition as that of Sample No. 2 in Example 1 were prepared in a manner substantially the same as that described in Example 1, except that in this Example 2, different heating temperatures and different heating times were used. FIG. 5 shows the two curves of heating time vs. electrical resistance obtained by the humidity test (at 75 %RH, 20°C) of these prepared samples in the case of the heating temperatures of 130°C and 160°C, respectively. In the case of the heating temperature of 130°C, the preferable heating time was found to be between 3 minutes and 5 hours. This is because when the samples were made with heating time of less than 3 minutes, the samples were very unstable at a high humidity atmosphere, while when the samples were made with heating time Table 1

| Sample No. | Reactive Proportion (wt.%) | | Resistance of Humidity Sensor, 60 Hz, 20°C | | | |
|---|---|---|---|---|---|---|
| | Polyamide Resin | Chlorinated Natural Rubber | 30%RH | 50%RH | 75%RH | 95%RH |
| 1 | 45 | 55 | 29MΩ | 750KΩ | 25KΩ | 5.7KΩ |
| 2 | 65 | 35 | 16.2MΩ | 400KΩ | 18KΩ | 3.8KΩ |
| 3 | 80 | 20 | 38MΩ | 820KΩ | 30KΩ | 9.7KΩ |
| 4 | 90 | 10 | 100MΩ | 2.7MΩ | 112KΩ | 25KΩ |

(The humidities were measured by a well known method using inorganic saturation solution.) These humidity sensors have high sensitivities. For example, the sensor of Sample No. 2 has a sensitivity of approximately 70KΩ/%RH at 50 %RH. Further, these humidity sensors had rapid responses, i.e. response times of about 20 seconds. Still further, these humidity sensors had high stability with respect to the change of temperature. That is, the resistance change of these humidity sensors with the change of 1°C fell within the range of resistance change corresponding to the change of RH of about 0.2 to 0.3 %RH.

Another kind of stability of these humidity sensors was examined in the following manner. Each humidity sensor was placed under an atmosphere (20°C) having of more than 5 hours, the samples had too high resistances and were also unstable at a high humidity atmosphere. In the case of the heating temperature of 160° C, the preferable heating time was found to be between 2 minutes and 30 minutes. This is because of the same reasons as set forth above in connection with the heating temperature of 130°C.

EXAMPLE 3

Four humidity sensors were prepared in substantially the same manner as in Example 1, except that in this Example 3, different polyamide resins having different amine values were used. Table 2 indicates the kinds of the humidity sensors and shows the results of humidity tests.

Table 2

| Sample No. | Polyamide Resin | Amine Value | Reactive Proportion (wt. %) | | Resistance of Humidity Sensor, 60 Hz, 20°C | | | |
|---|---|---|---|---|---|---|---|---|
| | | | Polyamide Resin | Chlorinated Natural Rubber | 30%RH | 50%RH | 75%RH | 95%RH |
| 5 | Versamide 100 | 90 | 75 | 25 | — | 70MΩ | 4.8MΩ | 100KΩ |

Table 2 – Continued

| Sample No. | Polyamide Resin | Amine Value | Reactive Proportion (wt. %) Polyamide Resin | Chlorinated Natural Rubber | Resistance of Humidity Sensor, 60 Hz, 20°C 30%RH | 50%RH | 75%RH | 95%RH |
|---|---|---|---|---|---|---|---|---|
| 6 | Tohomide 215 | 225 | 75 | 25 | 90MΩ | 2.3MΩ | 118KΩ | 21KΩ |
| 7 | Tohomide 240 | 300 | 70 | 30 | 44MΩ | 1.1MΩ | 45KΩ | 9.5KΩ |
| 8 | Versamide 125 | 345 | 65 | 35 | 34MΩ | 850KΩ | 38KΩ | 8.0KΩ |

(Tohomide 215 and Tohomide 240 are trade names of Fuji Chemical Industrial Co., Japan; and Versamide 100 and Versamide 125 are trade names of General Mill Co., U.S.A.)

It was found that preferable amine value of a polyamide resin was more than 100

EXAMPLE 4

Three humidity sensors were prepared in substantially the same manner as in Example 1, except that in this Example 4, different chlorine containing polymers were used.

Table 3 indicates the kinds of humidity sensors and shows the results of humidity tests.

These humidity sensors had response times of about 30 seconds. The effect of the thin film of polydimethyl siloxan as a protective cover for each humidity sensitive film of humidity sensor was examined as follows. The curves as of FIG. 3 for Samples Nos. 1–4 and 12–15 were made. Then, Samples Nos. 1–4 and 12–15 were placed for 100 hours under an atmosphere having a high humidity of 95 %RH (40°C) and including 100 ppm sulfurous acid gas ($SO_2$). Thereafter, the curves as of FIG. 3 for these Samples were made. The curves for Samples Nos. 1–4 after the high humidity and $SO_2$ test were shifted from the curves for the same Samples Nos. 1–4 before the high humidity and $SO_2$ test by about 5 % in terms of %RH, whereas the curves for Samples Nos. 12–15 after the high humidity and $SO_2$ test were shifted from the curves for the same Samples Nos. 12–15 before the high humidity and $SO_2$ test by only about 2 % in terms of %RH.

Table 3

| Sample No. | Chlorine Containing Polymer | Reactive Proportion (wt. %) Polyamide Resin | Chlorine Containing Polymer | Resistance of Humidity Sensor, 60 Hz, 20°C 30%RH | 50%RH | 75%RH | 95%RH |
|---|---|---|---|---|---|---|---|
| 9 | Polyvinylidene Chloride | 75 | 25 | 4.5MΩ | 110KΩ | 48KΩ | 8.8KΩ |
| 10 | Polyvinyl Chloride | 75 | 25 | 175MΩ | 5.0MΩ | 200KΩ | 45KΩ |
| 11 | Chlorinated Polypropylene (Chlorine Content 34%) | 50 | 50 | 325MΩ | 8.8MΩ | 350KΩ | 75KΩ |

EXAMPLE 5

Four humidity sensors were prepared in the same manner as in Example 1. Then, polydimethyl siloxan solution was coated as a thin film on the humidity sensitive film of each humidity sensor as schematically shown in FIG. 2, and heated to evaporate the solvent at 90°C for 30 minutes. The resultant thin film of polydimethyl siloxan on each humidity sensitive film had a thickness of 1.5 microns. The humidity sensors with the thin films of polydimethyl siloxan showed sensitivities to relative humidities (RH) similar to those of the humidity sensors without the thin films of polydimethyl siloxan. Table 4 shows the results of humidity tests with respect to these four humidity sensors with the thin films of polydimethyl siloxan.

What we claim:

1. A humidity sensor comprising (1) a humidity sensitive film which consists essentially of a reaction product obtained by heating (a) a chlorine containing polymer selected from the group consisting of a chlorinated natural rubber, polyvinyl chloride, polyvinylidene chloride, chlorinated polyethylene and chlorinated polypropylene and (b) a polyamide resin, the reactive proportion of said chlorine containing polymer and said polyamide resin being 45 to 90 weight % of polyamide resin and 10 to 55 weight % of chlorine containing Table 4

| Sample No. | Reactive Proportion (wt. %) Polyamide Resin | Chlorinated Natural Rubber | Resistance of Humidity Sensor, 60 Hz, 20°C 30%RH | 50%RH | 75%RH | 95%RH |
|---|---|---|---|---|---|---|
| 12 | 45 | 55 | 30MΩ | 765KΩ | 27KΩ | 6.0KΩ |
| 13 | 65 | 35 | 16.0MΩ | 395KΩ | 16KΩ | 3.2KΩ |
| 14 | 80 | 20 | 36.5MΩ | 800KΩ | 28KΩ | 9.0KΩ |
| 15 | 90 | 10 | 120MΩ | 3.3MΩ | 150KΩ | 32KΩ |

polymer, and (2) two electrodes applied to said humidity sensitive film.

2. A humidity sensor according to claim 1, wherein said polyamide resin comprises a condensation product of an alkylene polyamine and a polycarboxylic acid obtained by thermal polymerization of an unsaturated fatty acid.

3. A humidity sensor according to claim 1, wherein said chlorine containing polymer is a chlorinated natural rubber.

4. A humidity sensor according to claim 1, which further comprises a protective cover coated on the humidity sensitive film thereof.

5. A humidity sensor according to claim 4, wherein said protective cover is a thin film of silicone resin.

6. A humidity sensor according to claim 1, wherein said polyamide resin has an amine value of more than 100.

* * * * *